UNITED STATES PATENT OFFICE.

FRANK W. HALL, OF PORT ARTHUR, TEXAS, ASSIGNOR TO THE TEXAS COMPANY, OF NEW YORK, N. Y., A CORPORATION OF TEXAS.

MANUFACTURE OF ALUMINUM CHLORIDE.

1,422,568.      Specification of Letters Patent.      Patented July 11, 1922.

No Drawing. Original application filed March 1, 1920, Serial No. 362,199. Divided and this application filed September 20, 1921. Serial No. 501,985.

*To all whom it may concern:*

Be it known that I, FRANK W. HALL, a citizen of the United States, residing in Port Arthur, in the county of Jefferson and State of Texas, have invented certain new and useful Improvements in the Manufacture of Aluminum Chloride, of which the following is a specification.

This application is divisional of one filed by me on March 1, 1920, Serial Number 362,199, and relates to the production of aluminum chloride by a new and improved method involving the use of an aluminum ore or compound, such as bauxite, sulfur and chlorin, the reaction being expressed according to my present knowledge and belief, as follows:

$$2Al_2O_3 + 3S + 6Cl_2 = 4AlCl_3 + 3SO_2.$$

One of the principal advantages of my process resides in the fact that it can be carried out at lower temperatures than are commonly required under existing methods, the low temperatures employed being due to two principal reasons: first, because the reaction is highly exothermic, and second, because all the substances entering into the reaction except the alumina are in a gaseous or vapor state.

One of the most common methods at present used for the manufacture of aluminum chloride, involves the mixing of soft coal and bauxite with a binder, coking the mixture and then chlorinating it. My invention represents a distinct advantage over methods of this type inasmuch as no coking step is required but the elementary substances, chlorin and sulfur are combined directly with alumina in a single operation.

The present invention contemplates the contacting of alumina, sulfur and chlorin in such manner and under such temperatures that the resulting reaction produces anhydrous aluminum chloride and relates particularly to a method of operation in which the alumina or other suitable aluminum compound is introduced into the reaction chamber in a powdered state. The sulfur and the chlorin are preferably introduced into the reaction chamber in the form of vapor. A convenient way of introducing the sulfur into the reaction chamber, however, is to melt it and allow it to flow in a liquid state to the chamber, the heat therein vaporizing it so that it will enter into the reaction. To obtain the necessary alumina for the reaction any suitable aluminous substance may be used, such as bauxite, aluminum silicate and various other alumina containing clays, it being understood that wherever the word alumina is used in this specification or in the claims it is meant to include any suitable alumina containing material.

In carrying on the process an atmosphere of chlorin and sulfur is maintained in the reaction chamber and powdered alumina, preferably in a finely divided form, is blown into the chamber while a temperature sufficient to produce anhydrous aluminum chloride is maintained. If desired, the alumina may be preheated before introducing it into the reaction chamber.

The aluminum chloride produced leaves the chamber in the form of vapor and may be condensed and collected in any suitable manner.

What I claim is:

1. The process of producing aluminum chloride which consists in maintaining an atmosphere of chlorin and sulfur vapors in a heated chamber and blowing powdered alumina thereinto.

2. The process of producing aluminum chloride which consists in maintaining an atmosphere of chlorin and sulfur vapors in a heated chamber and blowing an alumina containing substance thereinto.

3. The process of manufacturing aluminum chloride which consists in maintaining an atmosphere of chlorin and sulfur vapors in a heated chamber and blowing a powdered aluminum compound thereinto.

4. The process of manufacturing aluminum chloride which consists in reacting chlorin, sulfur and powdered alumina under conditions to form aluminum chloride.

5. The process of producing aluminum chloride which consists in introducing powdered alumina into a chamber containing chlorin and sulfur vapors and heated to reaction temperatures.

6. The process of producing aluminum chloride which consists in passing chlorin and melted sulfur into a heated chamber where the sulfur vaporizes, and introducing powdered alumina into the vapors in said chamber.

7. The process of producing aluminum chloride which consists in maintaining an atmosphere of chlorin and sulfur vapors in a heated chamber, preheating alumina and introducing said heated alumina in powdered form thereinto.

8. The process of producing aluminum chloride which consists in reacting chlorin and sulfur in the vaporous state with powdered alumina in the presence of heat.

In witness whereof I have hereunto set my hand this 1st day of September, 1921.

FRANK W. HALL.